(12) United States Patent
Terada et al.

(10) Patent No.: US 7,190,800 B2
(45) Date of Patent: Mar. 13, 2007

(54) HOWLING CONTROL DEVICE AND HOWLING CONTROL METHOD

(75) Inventors: Yasuhiro Terada, Yokohama (JP); Atsunobu Murase, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 517 days.

(21) Appl. No.: 10/483,176

(22) PCT Filed: Mar. 12, 2003

(86) PCT No.: PCT/JP03/02894

§ 371 (c)(1),
(2), (4) Date: Jan. 9, 2004

(87) PCT Pub. No.: WO03/077594

PCT Pub. Date: Sep. 18, 2003

(65) Prior Publication Data

US 2004/0170283 A1  Sep. 2, 2004

(30) Foreign Application Priority Data

Mar. 12, 2002 (JP) ............................. 2002-067083

(51) Int. Cl.
H04B 15/00 (2006.01)
H04R 29/00 (2006.01)
H04M 9/08 (2006.01)

(52) U.S. Cl. .................... 381/93; 381/56; 381/94.2; 381/94.3; 379/406.14

(58) Field of Classification Search ................. 381/93, 381/94.1–94.3, 95, 56, 318, 66; 379/406.14
See application file for complete search history.

(56) References Cited

U.S. PATENT DOCUMENTS

| 4,535,445 | A |   | 8/1985 | Lane et al. |
| 5,014,294 | A | * | 5/1991 | Kromenaker et al. ....... 455/570 |
| 5,442,712 | A | * | 8/1995 | Kawamura et al. ........... 381/83 |
| 5,548,642 | A | * | 8/1996 | Diethorn ................ 379/406.14 |

FOREIGN PATENT DOCUMENTS

| EP | 0 599 450 A2 | 6/1994 |
| JP | 05-207596 | 8/1993 |
| JP | 11-331357 | 11/1999 |
| JP | 2001-024778 | 1/2001 |
| JP | 2001-285986 | 10/2001 |

* cited by examiner

Primary Examiner—Vivian Chin
Assistant Examiner—Douglas Suthers
(74) Attorney, Agent, or Firm—Nath Law Group PLLC; Jerald L. Meyer; Derek Richmond

(57) ABSTRACT

A howling control apparatus and howling control method for controlling time up to the cancellation of howling suppression according to a howling occurrence situation, thereby eliminating the repetition of howling suppression and cancellation. A howling detecting section (104) detects howling based on the band level and the band level average value and measures time for which no howling occurs, a waiting time setting section (105) decides waiting time to be set this time from time for which no howling occurs and a previous waiting time, and a gain control section (106) causes a gain that is set to a howling suppressing section (107) to be retuned to a normal value during the waiting time.

11 Claims, 17 Drawing Sheets

HOWLING CONTROL DEVICE AND HOWLING CONTROL METHOD

TECHNICAL FIELD

The present invention relates to a howling control apparatus and howling control method for controlling howling generated by sound coupling between a speaker and a microphone in an acoustic apparatus having a microphone and a speaker such as a hearing aid, a loud-speaker system, and the like.

BACKGROUND ART

Conventionally, as illustrated in FIG. 1, the howling control apparatus of this type included an input terminal 1008, a band dividing section 1001, a band level calculating section 1002, a band level average value calculating section 1003, a howling detecting section 1004, a gain control section 1005, a howling suppressing section 1006, a band combining section 1007, and an output terminal 1009.

The band dividing section 1001 provides one frame (frame length: approximately 10 to 100 ms) buffering to an output signal of a microphone amplifier input to the input terminal 1008 and that of an AD converter and the like and divides a time signal x(t) into signals (band division signals) xi(t) of a predetermined number (for example, M, M is a positive integer) of frequency bands in a frame unit (i is a positive integer including 0 to M-1 and called band number) by a method such as a polyphase filter, a Fast Fourier Transform (FFT), or a bandpass filter and the like. The following processing is independently performed for each of M band division signals in a frame unit.

The band level calculating section 1002 calculates each level Li(t) such as each band power or amplitude using band division signals xi(t) subjected to the band division by the band dividing section 1001.

The band level average value calculating section 1003 adds the respective M band levels Li(t) and performs division by the number of added bands (M) to calculate a band level average value Lave(t).

The howling detecting section 1004 performs processing as illustrated in a flowchart of FIG. 2 to set a value to a howling detection flag dtct_flg-i of each band vision signal.

First of all, in order to check whether howling is being suppressed currently, the value of howling detection flag dtct_flg-i is confirmed (S1001). When the value of howling detection flag dtct_flg-i is 0x0000 (0xnnnn indicates that nnnn is a hexadecimal number), it is judged that no howling is being suppressed currently and determination on howling is performed.

Next, a level ratio Ri(t) is calculated according to the following equation using the band level Li(t) and the band level average Lave(t) (S1002):

$Ri(t)=Li(t)/Lave(t)$

Sequentially, comparison between a level ratio Ri(t) and a level ratio threshold Th_R is performed (S1003). When Ri(t)>Th_R as a result of comparison, a value of a howling detection counter dtct_cnt-i is compared with a count threshold Th_cnt (S1004).

When dtct_cnt-i>Th_cnt, a band level average value Lave(t) of a current frame is substituted into a reference level Lref-i(t) (S1005), and the value of howling detection flag dtct_flg-i is set to 0xffff (S1006).

When dtct_cnt-i≦Th_cnt, the value of counter dtct_cnt-i is incremented by one (S1007).

When Ri(t)≦Th_R as a result of comparison in S1003, the value of counter dtct_cnt-i is reset to '0' (S1008).

The gain control section 1005 sets a gain Gi(t) by processing as illustrated in a flowchart of FIG. 3.

First of all, it is checked whether howling is detected with reference to the howling detection flag dtct_flg-i (S1011). When dtct_flg-i=0xffff, the gain Gi(t) is updated according to the following equation in order to suppress the howling (S1012):

$Gi(t)=Gi(t-1) \times Gdown$ where Gdown is an update quantity for reducing the gain and a value of 0<Gdown<1 is obtained.

Next, a ratio between the band level Li(t) and the reference level Lref-i(t) is compared with a gain control threshold Th_Ctrl_gain (S1013). When Li(t)/Lref-i(t)<Th_Ctrl_gain, since it is judged that occurrence of howling is stopped, the value of howling detection flag dtct_flg-i is set to 0x0000 in order to shift processing to processing for returning the gain Gi(t) to '1' (S1014).

When the howling detection flag dtct_flg-i=0x0000 as a result of the comparison in S1011, since no howling occurs, if the gain Gi(t) is under 1, the gain Gi(t) is updated according to the following equation in order to return the gain to one time (S1015).

$Gi(t)=Gi(t-1) \times Gup$ where Gup is an update quantity for increasing the gain and a value of Gup>1 is obtained.

The howling suppressing section 1006 multiplies the band division signals xi(t) subjected to band division by the band dividing section 1001 by the gain Gi(t) set by the gain control section 1005 to obtain yi(t) according to the following equation:

$yi(t)=xi(t) \times Gi(t)$

The band combining section 1007 calculates a time signal y(t) using the above yi(t) by a method corresponding to the band division method such as a polyphase filter, an FFT, and the like performed by the band dividing section 1001.

However, in such the conventional howling control apparatus, since a consideration of whether there is a situation in which howling easily occurs is not given at the time of canceling the suppression of howling, there is a problem in which the suppression of howling is cancelled though a situation in which howling easily occurs continues since, for example, much time is taken to attach a hearing aid, with the result that occurrence of howling→suppression→cancellation→occurrence→suppression→cancellation→ . . . are repeated, resulting in a grating sound.

DISCLOSURE OF INVENTION

An object of the present invention is to control time up to the cancellation of howling suppression according to a howling occurrence situation to eliminate the repetition of howling suppression and cancellation.

The subject of the present invention is to measure a howling observing time that is time for which no howling occurs to control processing for returning a gain used in howling suppression processing according to the howling observing time after the howling suppression processing at the time when howling occurs.

According to one embodiment of the present invention, a howling control apparatus adopts a configuration including detecting means for measuring a howling observing time that is time for which no howling occurs in an input signal and for detecting howling when the howling occurs in the input signal, control means for controlling suppression processing of the detected howling by setting a gain based on the howling observing time, and suppressing means for performing howling suppression processing to the input signal using the gain.

According to another embodiment of the present invention, a howling control method including the steps of measuring a howling observing time that is time for which no howling occurs in an input signal detecting howling when the howling occurs in the input signal, controlling suppression processing of the detected howling by setting a gain based on the howling observing time, and performing howling suppression processing to the input signal using the gain.

BEST MODE FOR CARRYING OUT THE INVENTION

Embodiments of the present invention will be explained with reference to the drawings.

Embodiment 1

FIGS. 4 to 8 are views each illustrating a howling control apparatus according to Embodiment 1 of the present invention.

Figure 1:
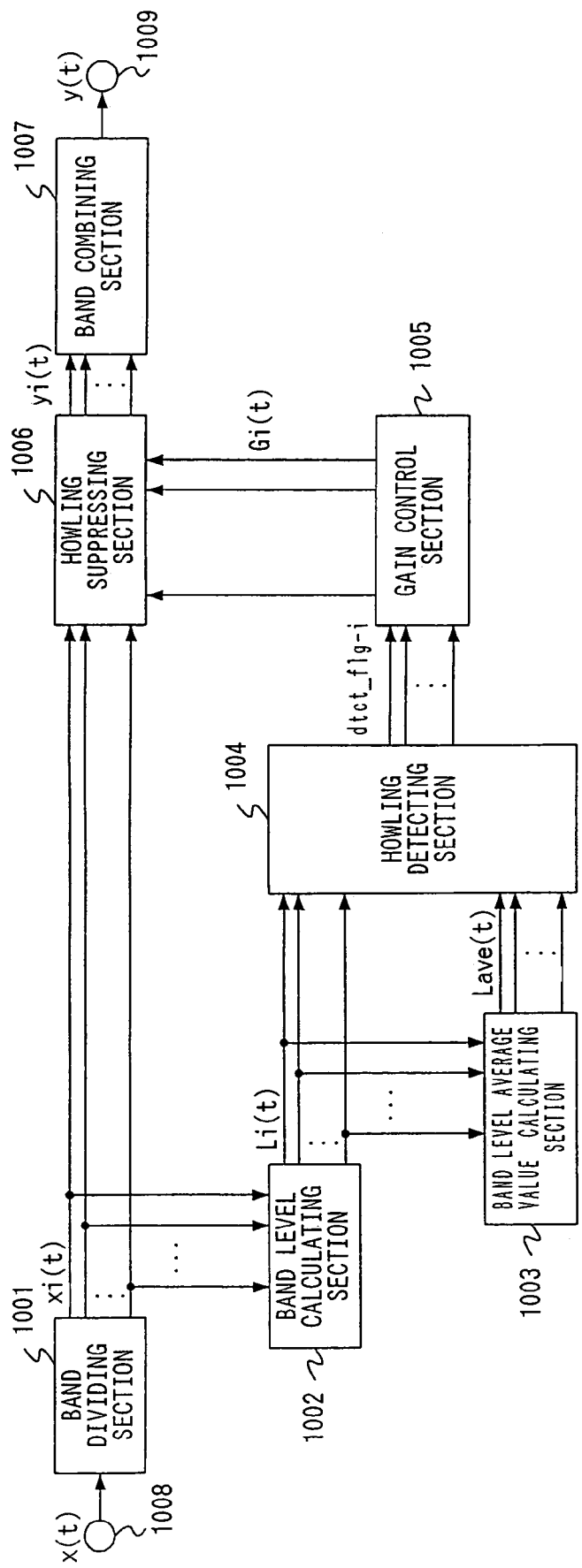
FIG. 1 is a schematic block diagram illustrating a conventional howling control apparatus.
Figure 2:
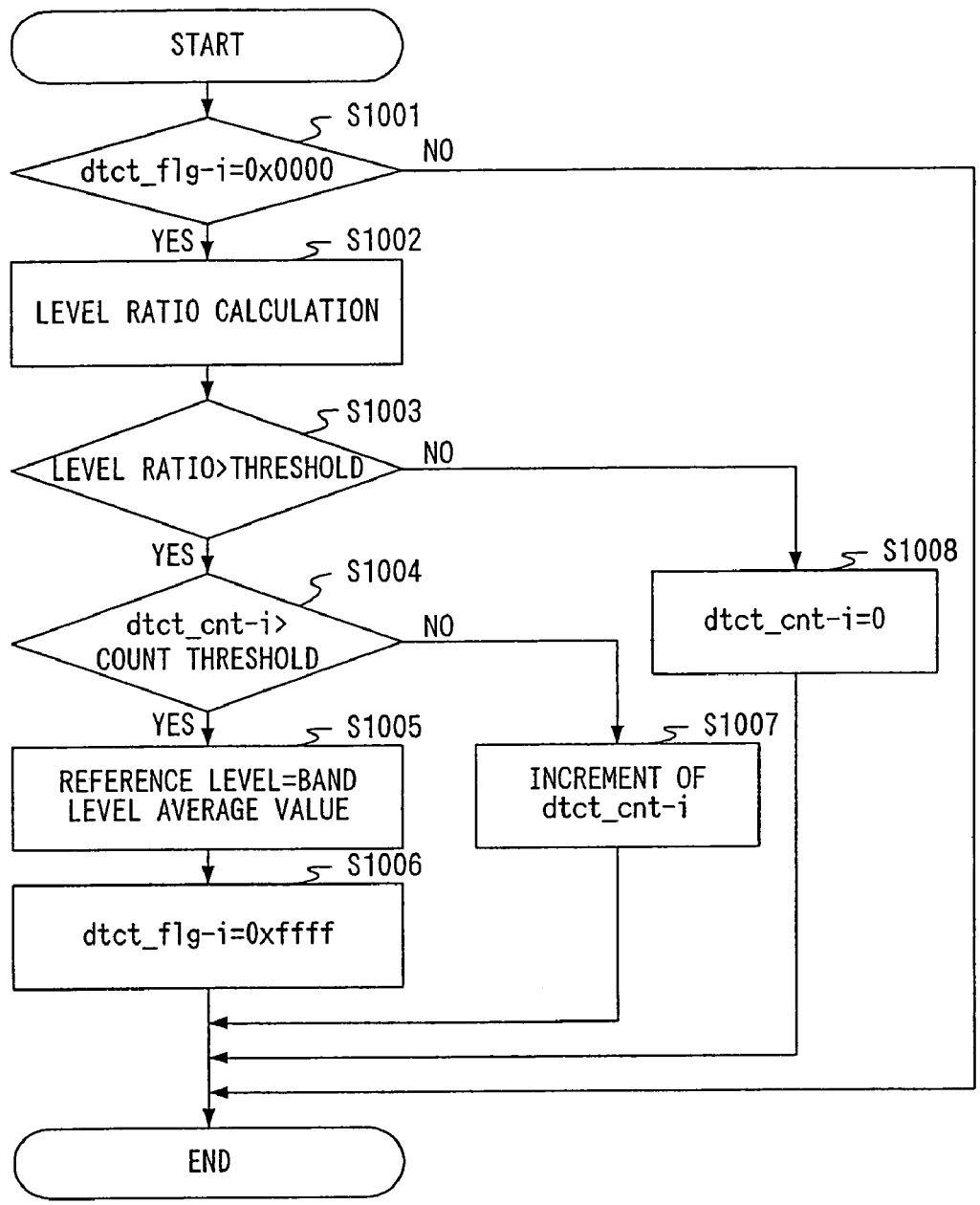
FIG. 2 is a flowchart illustrating processing of a howling detecting section of a conventional howling control apparatus.
Figure 3:
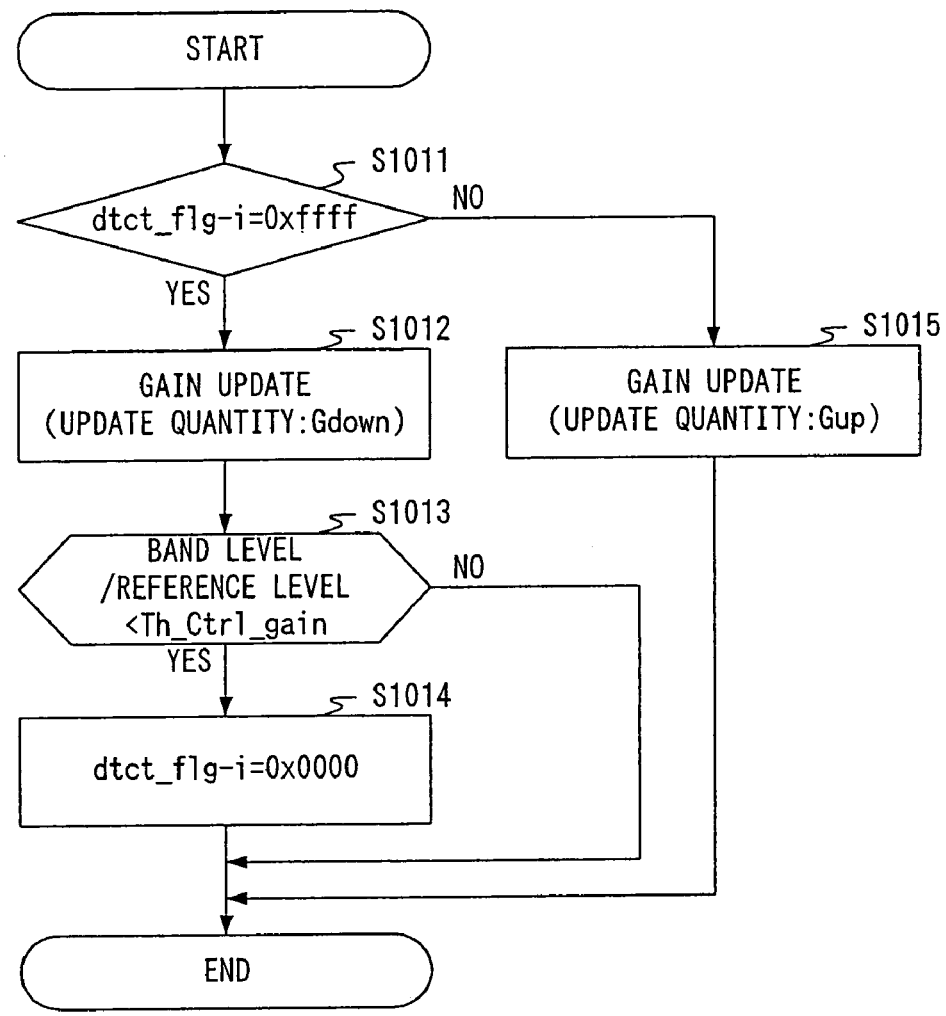
FIG. 3 is a flowchart illustrating processing of a gain control section of a conventional howling control apparatus.
Figure 4:
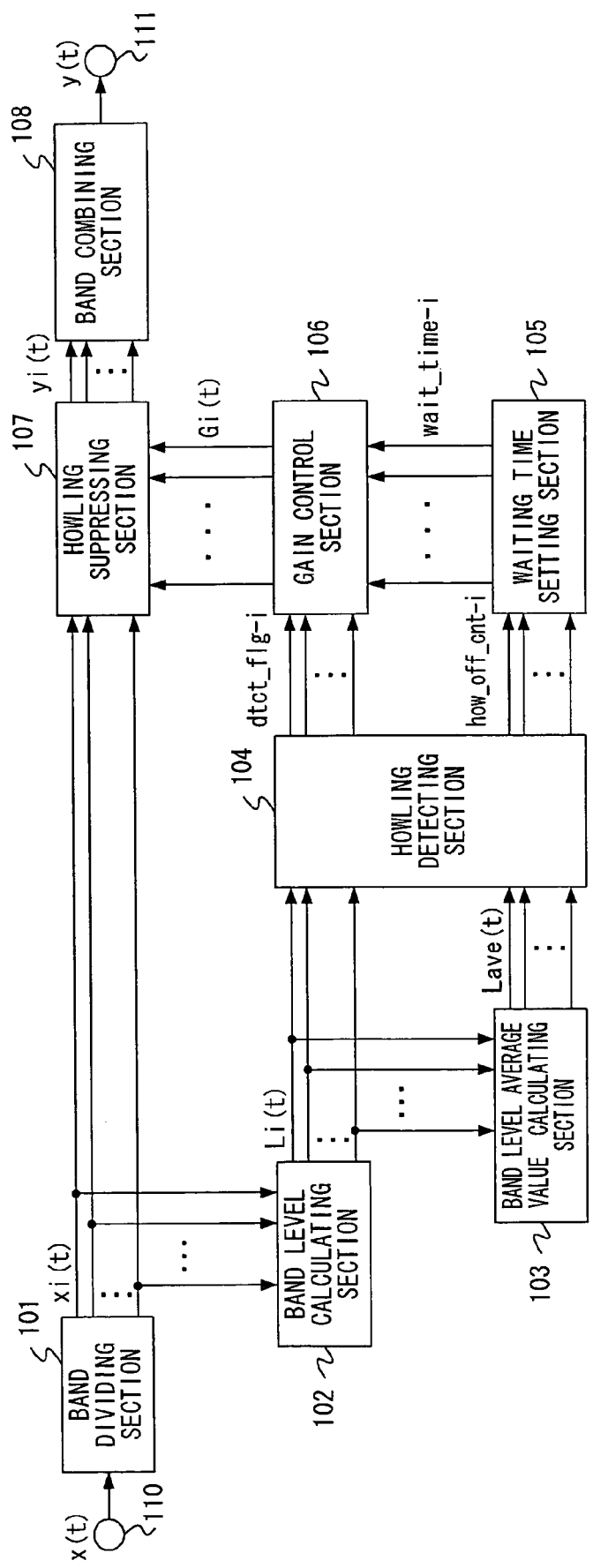
FIG. 4 is a schematic block diagram illustrating a howling control apparatus according to Embodiment 1 of the present invention.

As illustrated in FIG. 4, the howling control apparatus of this embodiment includes an input terminal 110 to which an output signal of a microphone amplifier and that of an AD converter are input, a band dividing section 101 that divides the signal input to the input terminal 110 into signals of a plurality of frequency bands, a band level calculating section 102 calculates band levels of the signals of the plurality of frequency bands divided by the band dividing section 101, a band level average value calculating section 103 that calculates an average value of the respective band levels calculated by the band level calculating section 102, a howling detecting section 104 that detects howling based on the band levels and the band level average value and measures time for which no howling occurs (howling observing time), a waiting time setting section 105 that decides a waiting time to be set this time from the howling observing time and a previous waiting time, a gain control section 106 that sets a gain based on a result of the howling detecting section 104, a howling suppressing section 107 that multiplies the frequency band signals subjected to the band division by the band dividing section 101 by the gain set by the gain control section 106, a band combining section 108 that combines the plurality of frequency band signals, and an output terminal 111 that outputs a combined signal.

Figure 5:
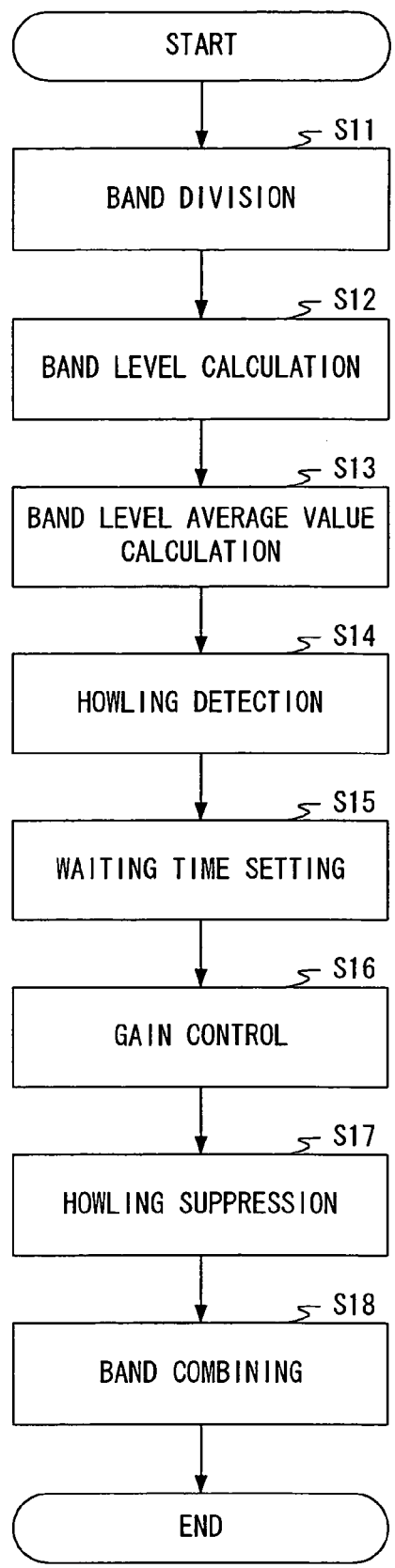
FIG. 5 is a flowchart illustrating processing of a howling control apparatus according to Embodiment 1 of the present invention.

An operation of such a howling control apparatus will be explained with reference to a flowchart of FIG. 5.

First of all, the band dividing section 101 provides one frame (frame length: approximately 10 to 100 ms) buffering to a signal input to the input terminal 110 and divides a time signal x(t) into signals (band division signals) xi(t) of a predetermined number (for example, M, M is a positive integer) of frequency bands in a frame unit (i is a positive integer including 0 to M-1 and called band number)by a method such as a polyphase filter, a Fast Fourier Transform (FFT), or a bandpass filter and the like (S11). The following processing is independently performed for each of M band division signals in a frame unit.

Next, the band level calculating section 102 calculates a level Li(t) such as band power or amplitude using band division signals xi(t) subjected to band division by the band dividing section 101(S12).

After that, the band level average value calculating section 103 adds the respective M band levels Li(t) and performs division by the number of added bands (M) to calculate a band level average value Lave(t) (S13).

Figure 6:
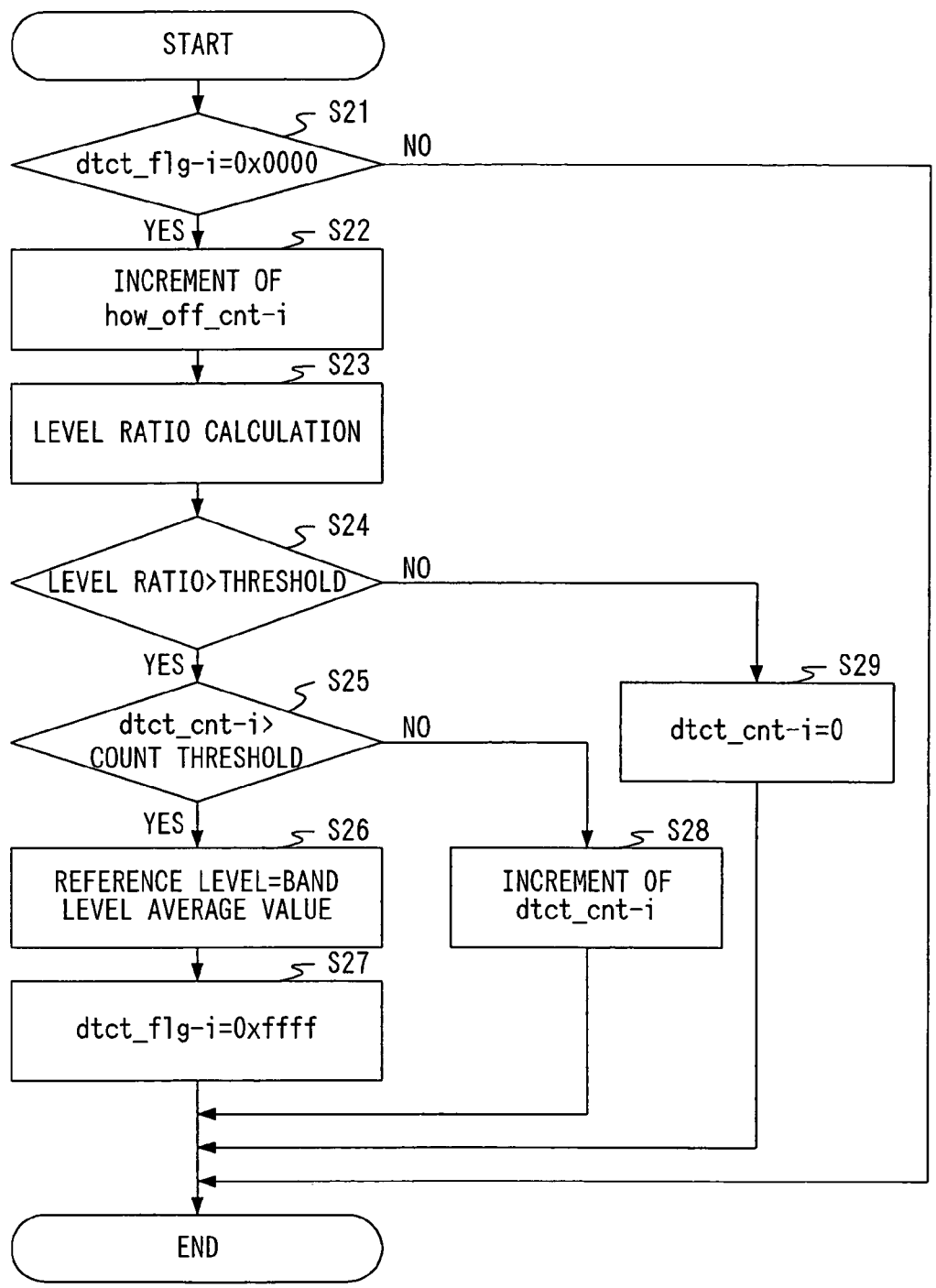
FIG. 6 is a flowchart illustrating processing of a howling detecting section of a howling control apparatus according to Embodiment 1.

Sequentially, the howling detecting section 104 detects howling by processing as illustrated in a flowchart of FIG. 6 (S14).

As illustrated in FIG. 6, first of all, in order to check whether howling is being suppressed currently, a value of howling detection flag dtct_flg-i is conformed (S21).

When the value of howling detection flag dtct_flg-i is 0x0000, it is judged that no howling is being suppressed currently and a value of howling observing time how_off_cnt-i is incremented by '1' to count time for which no howling occurs (S22).

Next, a level ratio Ri(t) (i is a band number) is calculated according to the following equation using the band level Li(t) and the band level average Lave(t) (S23):

$$Ri(t)=Li(t)/Lave(t)$$

Sequentially, comparison between the calculated level ratio Ri(t) and a level ratio threshold Th_R is performed (S24). When Ri(t)>Th_R as a result of comparison, a value of a howling detection counter dtct_cnt-i is compared with a count threshold Th_cnt (S25).

When dtct_cnt-i>Th_cnt, a band level average value Lave(t) of a current frame is substituted into a reference level Lref-i(t) (S26), and the value of howling detection flag dtct_flg-i is set to 0xffff (S27).

When dtct_cnt-i≦Th_cnt as a result of determination in S25, the value of counter dtct_cnt-i is incremented by '1' (S28).

When Ri(t)≦Th_R as a result of comparison in S24, the value of counter dtct_cnt-i is reset to '0' (S29).

The waiting time setting section 105 sets a current waiting time wait_time-i from the thus set howling observing time how_off_cnt-i and a previously set waiting time (S15).

Figure 7A:
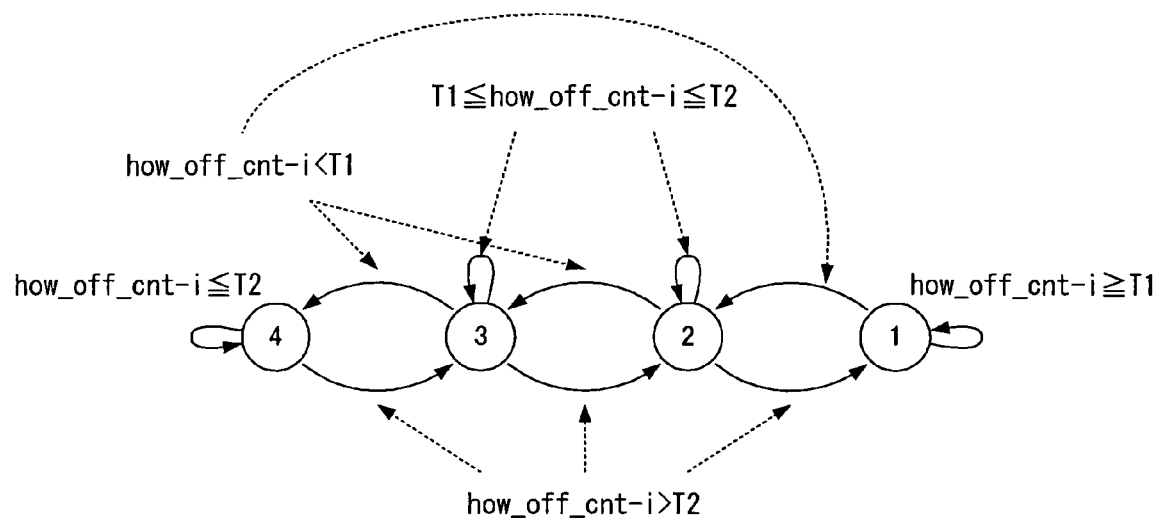
FIG. 7A is a state transition view illustrating an operation of a waiting time setting section of a howling control apparatus according to Embodiment 1.
Figure 7B:
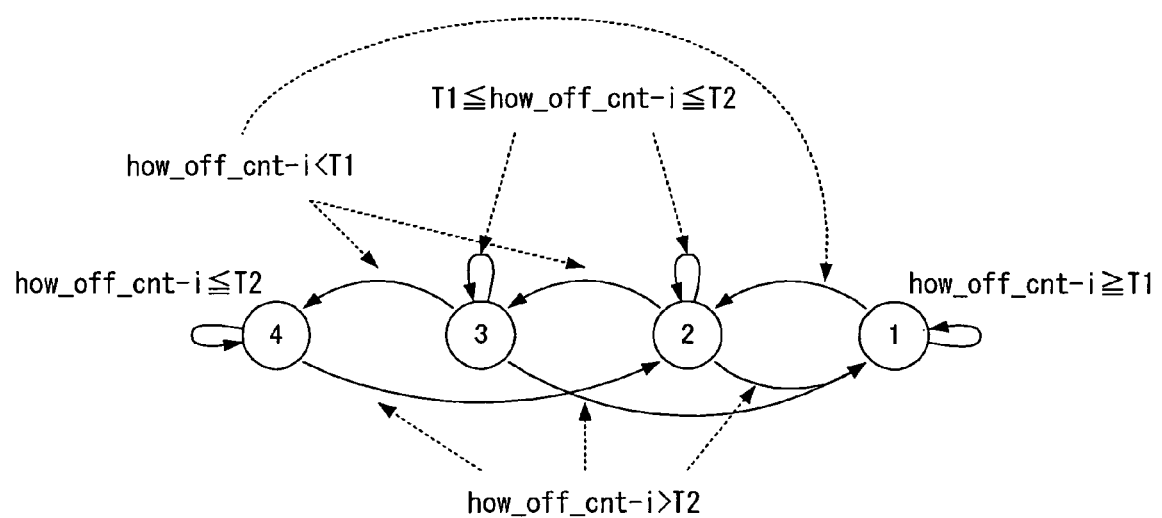
FIG. 7B is a state transition view illustrating another operation of a waiting time setting section of a howling control apparatus according to Embodiment 1.

The waiting time setting section 105 refers to the howling observing time how_off_cnt-i for each frame and sets a waiting time based on this value according to state transition views in FIGS. 7A and 7B. FIGS. 7A and 7B are views each illustrating a different state transition example. In addition, it is assumed that values of thresholds T1 and T2 used to perform determination on the howling observing time how_off_cnt-i are, for example, T1=1563 frames, T2=18750 frames, respectively.

A basic idea of the waiting time setting is that waiting time wait_time-i is set to be shorter since it can be considered that no howling frequently occurs if the howling observing time how_off_cnt-i is long. While, since it can be considered that howling frequently occurs if the howling observing time how_off_cnt-i is short, waiting time wait_time-i is set to be longer.

First, in FIG. 7A, an initial state is a state 1, and wait-time-i is set to 0 frame in the state 1, and the state stays in the state 1 during how_off_cnt-i≦T1.

When how_off_cnt-i<T1 is reached, the state 1 transits to a state 2, and wait-time-i is set to, for example, 3125 frames in the state 2. The state stays in the state 2 during T1≦how_off_cnt-i≦T2, and returns to the state 1 when how_off_cnt-i>T2 is reached.

Moreover, when how_off_cnt-i<T1 is reached, the state 2 transits to a state 3, and wait-time-i is set to, for example, 9375 frames in the state 3. The state stays in the state 3 during T1≦how_off_cnt-i≦T2, and returns to the state 2 when how_off_cnt-i>T2 is reached.

Still moreover, when how_off_cnt-i<T1 is reached, the state 3 transits to a state 4, and wait-time-i is set to, for example, 18750 frames in the state 4. The state stays in the state 4 during T1≦how_off_cnt-i≦T2, and returns to the state 3 when how_off_cnt-i>T2 is reached.

Next, in FIG. 7B, an initial state is a state 1, and wait-time-i is set to 0 frame in the state 1, and the state stays in the state 1 during how_off_cnt-i≧T1.

When how_off_cnt-i<T1 is reached, the state 1 transits to a state 2, and wait-time-i is set to, for example, 3125 frames in the state 2. The state stays in the state 2 during T1≦how_off_cnt-i≦T2, and returns to the state 1 when how_off_cnt-i>T2 is reached.

Moreover, when how_off_cnt-i<T1 is reached, the state 2 transits to a state 3, and wait-time-i is set to, for example, 9375 frames in the state 3. The state stays in the state 3 during T1≦how_off_cnt-i≦T2, and returns to the state 1 when how_off_cnt-i>T2 is reached.

Still moreover, when how_off_cnt-i<T1 is reached, the state 3 transits to a state 4, and wait-time-i is set to, for example, 18750 frames in the state 4. The state stays in the state 4 during T1≦how_off_cnt-i≦T2, and returns to the state 2 when how_off_cnt-i>T2 is reached.

Here, for example, when sampling frequency Fs=20 kHz, the number of FFT points=128 samples, and frame shift=64 samples, 1563 frames during T1≈5s, 18750 frames during T2=60 s, 3125 frames during waiting time in state 2=10 s, 9375 frames during waiting time in state 3=30 s, and 18750 frames during waiting time in state 4=60 s.

Figure 8:
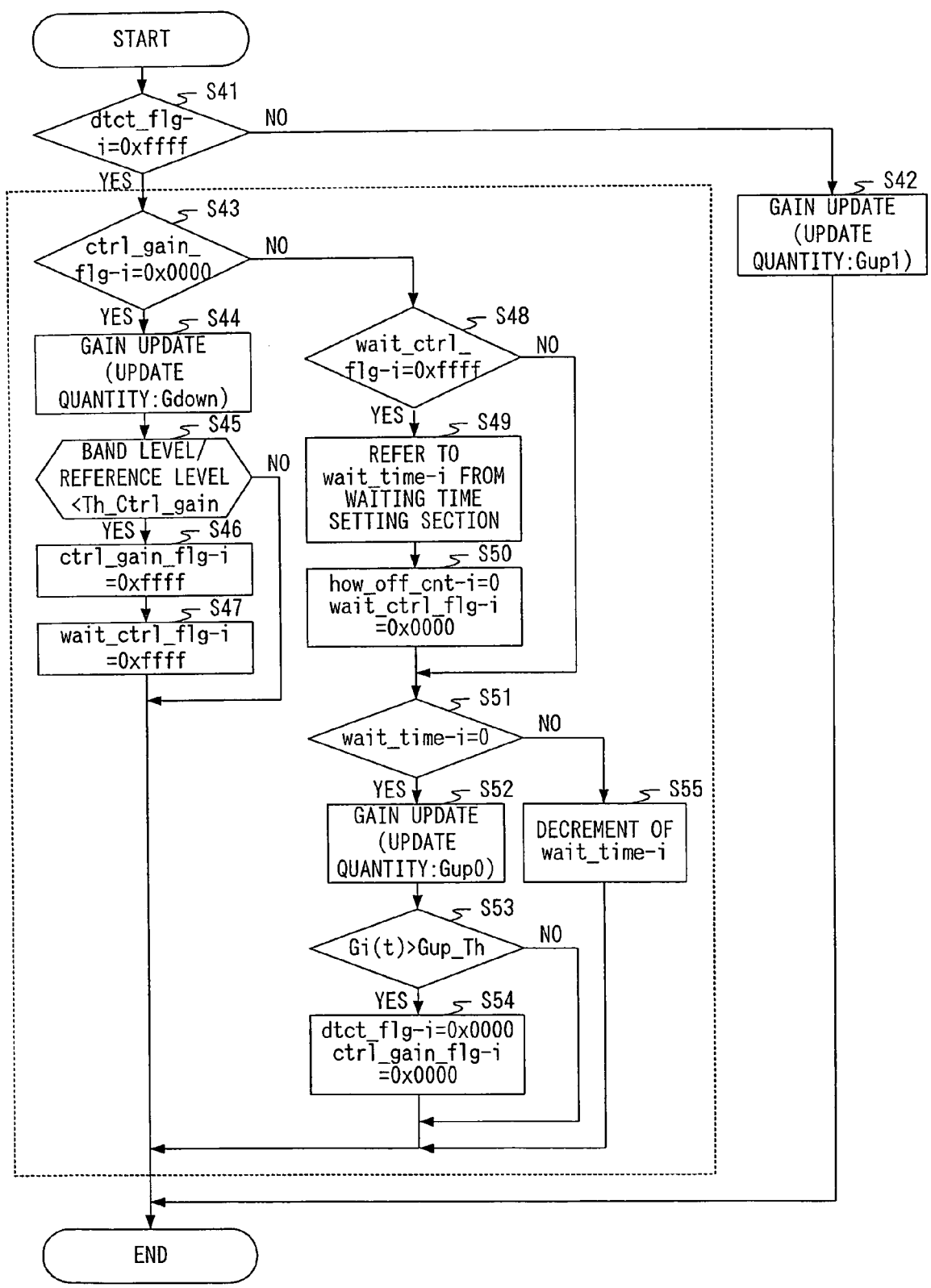
FIG. 8 is a flowchart illustrating processing of a gain control section of a howling control apparatus according to Embodiment 1.

Next, the gain control section 106 controls a gain by processing illustrated in a flowchart of FIG. 8 (S16)

As illustrated in FIG. 8, first of all, reference is made to the howling detection flag dtct_flg-i set by the howling detection section 104 to check whether howling is detected (S41).

When dtct_flg-i=0x0000, it is judged that no howling occurs, and if the gain Gi(t) is under 1, the gain Gi(t) is updated according to the following equation in order to return the gain to '1' (S42).

$$Gi(t)=Gi(t-1)\times Gup1$$

where Gup1 is an update quantity for increasing the gain and a value of Gup1>1 is obtained.

When dtct_flg-i=0x0000, it is judged that howling occurs, and reference is made to the gain control flag ctrl_gain_flg-i to perform determination on whether gain Gi(t) (i is a band number) should be decreased to suppress howling or gain Gi(t) should be increased to cancel suppression (S43). When ctrl_gain_flg-i=0x0000, the gain Gi(t) is updated according to the following equation in order to suppress howling (S44).

$$Gi(t)=Gi(t-1)\times Gdown$$

where Gdown is an update quantity for decreasing the gain and a value of 0<Gdown<1 is obtained. Moreover, a gain lower limit value is provided, thereby enabling to prevent suppression more than necessary.

Next, a ratio between the band level Li(t) and the reference level Lref-i(t) is compared with a gain control threshold Th_Ctrl_gain (S45).

When Li(t)/Lref-i(t)≧Th_Ctrl_gain as a result of comparison, processing ends. When Li(t)/Lref-i(t)<Th_Ctrl_gain, it is judged that occurrence of howling is stopped and processing shifts to processing for returning the gain Gi(t) to '1', so that the value of ctrl_gain_flg-i is set to 0xffff (S46) and the value of the waiting time setting flag wait_ctrl_flg-i for determining whether gain Gi(t) should be immediately returned to '1' is set to 0xffff (S47).

When ctrl_gain_flg-i=0xffff as a result of comparison in S43, it is judged that occurrence of howling is stopped, and reference is made to the value of the waiting time setting flag wait_ctrl_flg-i for determining whether a waiting time is set (S48). When wait_ctrl_flg-i=0xffff, since wait_time-i before performing processing (gain return processing) for returning the gain to '1' is not set, setting is performed with reference to the waiting time set by the waiting time setting section 105 (S49).

After that, the howling observing time how_off_cnt-i is reset to '0' as a preparation to a next processing, and wait_ctrl_flg is set to 0x0000 in order to indicate that the waiting time is set (S50).

When wait_ctrl_flg-i=0x0000 as a result of comparison in S48, processing flow proceeds to a next step since the waiting time is set.

Next, reference is made to waiting time wait_time-i to judge whether gain return processing should be performed (S51). When wait_time-i=0, the gain Gi(t) is updated according to the following equation in order to return the gain to '1' since the set waiting time has passed after the howling suppression (S52).

$$Gi(t)=Gi(t-1) \times Gup0$$

where Gup0 is an update quantity for increasing the gain and a value of Gup0>1 is obtained.

Next, it is determined whether the gain Gi(t) exceeds a gain threshold Gup_Th (for example, 0.7 times (=-3.0 dB)) (S53) and when the gain Gi(t) exceeds the gain threshold Gup_Th, 0x0000 is set to the howling detection flag dtct_flg-i and the gain control flag ctrl_gain_flg-i to restart the detection of howling (S54).

When the waiting time wait_time-i>0 as a result of comparison in S51, wait_time-i is decremented by '1' since the set waiting time has not yet passed (S55).

Next, by use of the gain Gi(t) thus obtained, the howling suppressing section 107 multiplies the band division signals xi(t) subjected to the band division by the band dividing section 101 by the gain Gi(t) to obtain yi(t) (S17).

$$yi(t)=xi(t) \times Gi(t)$$

Next, the band combining section 108 calculates a time signal y(t) using the above yi(t) by a method corresponding to the band division method such as a polyphase filter, an FFT, and the like performed by the band dividing section 101, and outputs y(t) to an DA converter, an amplifier, a speaker, and the like through the output terminal 111.

As explained above, in the howling control apparatus of this embodiment, the howling detecting section 104 counts the number of frames in which no howling occurs, and the waiting time setting section 105 sets a waiting time up to the time when the suppression of howling is stopped based on the number of frames and a previous waiting time, so that it is possible to continue the suppression of howling without repeating the suppression of howling and the cancellation even in a transient situation where howling occurrence and stopping frequently occur.

Additionally, in this embodiment, the band level calculating section 102 calculated the respective levels of the band division signals divided by the band dividing section 101. However, the band level calculating section 102 may add frequency band signals divided by the band dividing section 101 by the predetermined number thereof, and use them as one band. For example, when the band dividing section 101 frequency divides the time signal into 128 points by the FFT and the band level calculating section 102 uses FFT 4 points as one band, the number of bands becomes 16 bands (=128 points/2/4 points).

Figure 9:
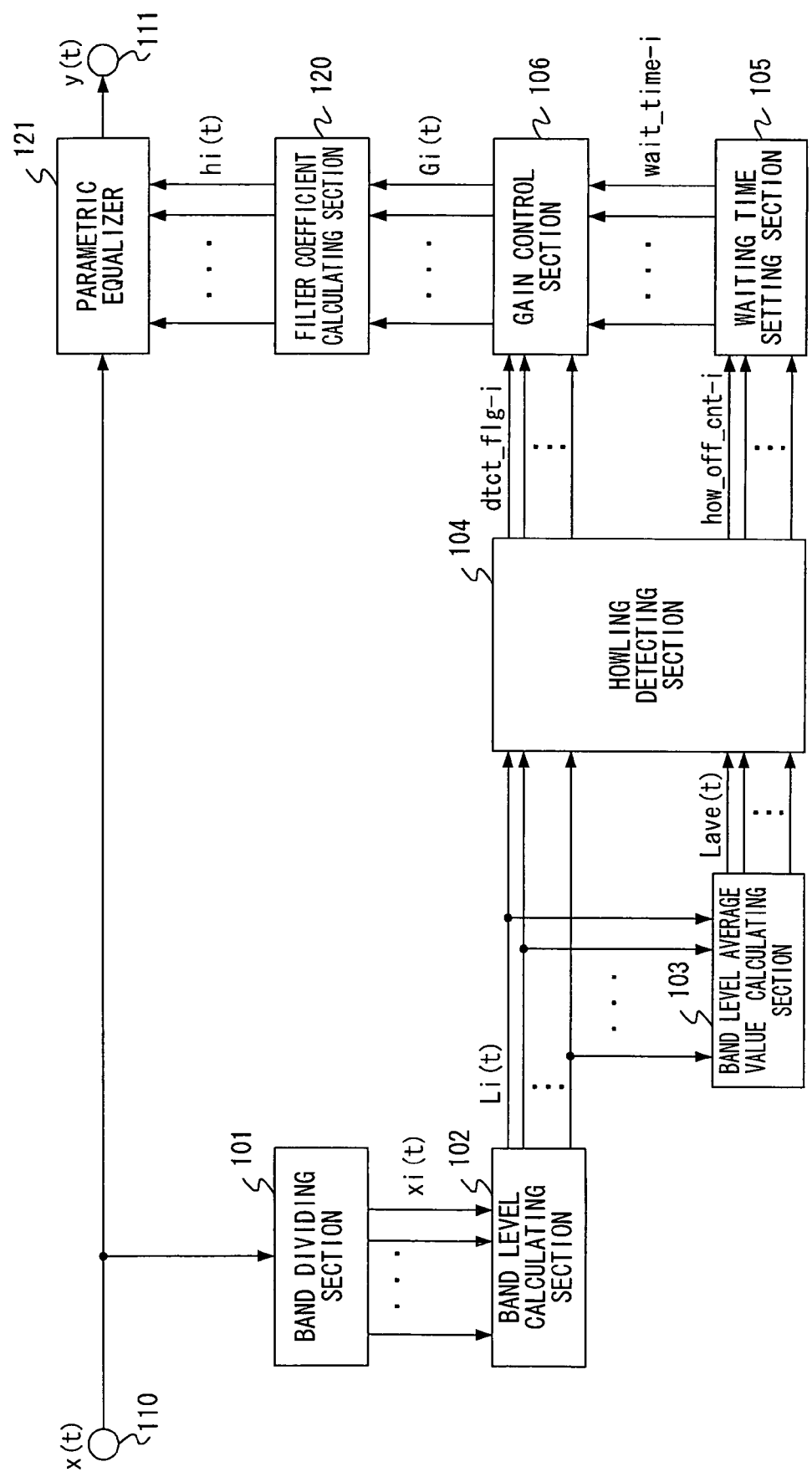
FIG. 9 is a schematic block diagram illustrating a howling control apparatus according to another specific form of Embodiment 1.

Another specific form of this embodiment is characterized in that a parametric equalizer 121 that performs filter processing for each divided frequency band and a filter coefficient calculating section 120 that calculates a filter coefficient of each frequency band of the parametric equalizer 121 are provided in place of the howling suppressing section 107 and the band combining section 108 as illustrated in FIG. 9.

Figure 10:
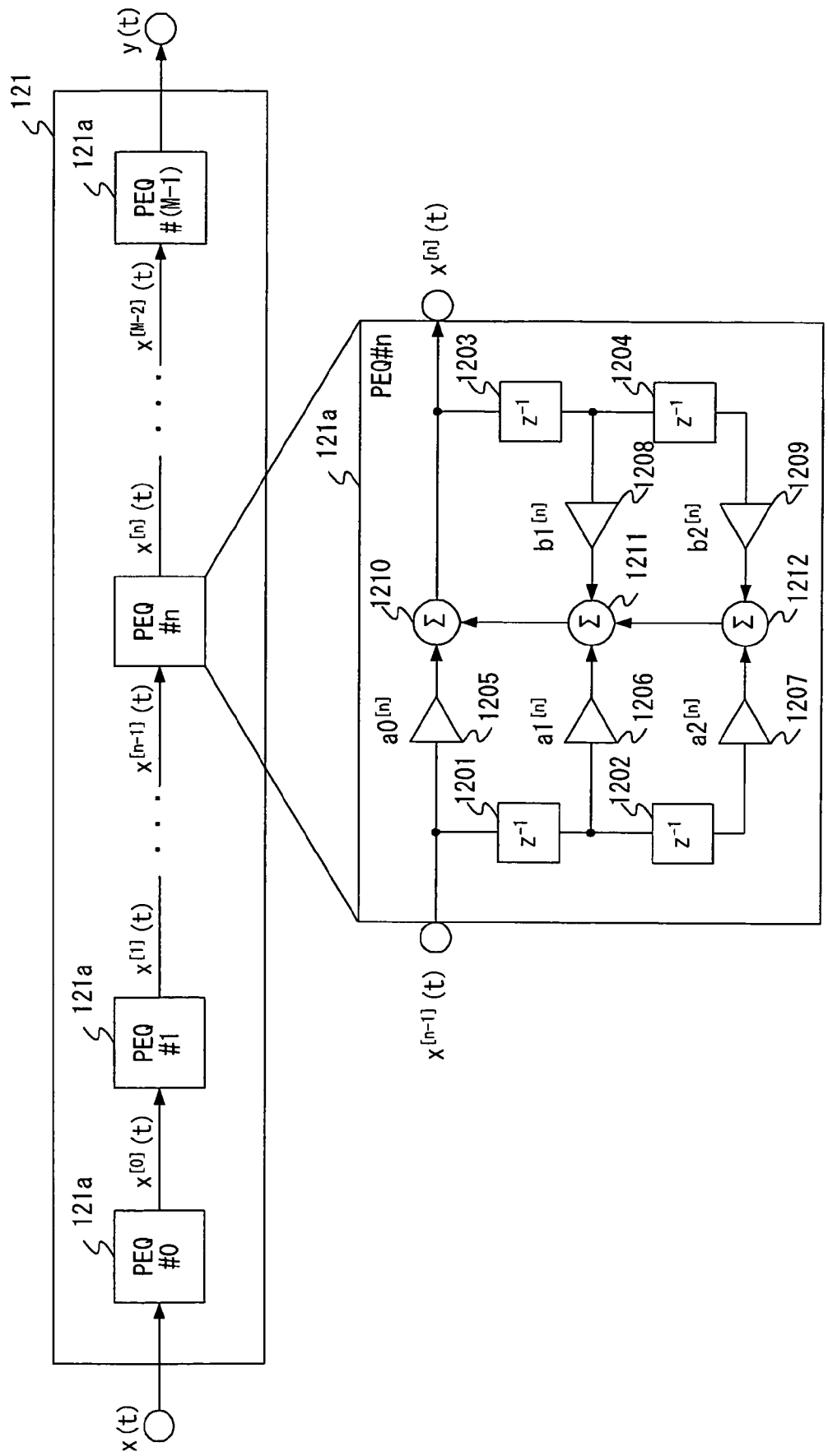
FIG. 10 is a schematic block diagram illustrating a parametric equalizer of a howling control apparatus according to another specific form of Embodiment 1.

The parametric equalizer 121 has secondary IIR (Infinite Impulse Response) filters 121a connected to each other in series that correspond to the number of divided bands (M) as illustrated in FIG. 10.

The IIR filter 121a includes delay devices 1201 to 1204, multipliers 1205 to 1209, and adders 1210 to 1212, and coefficients calculated by the filter coefficient calculating section 120 are used as coefficients a0, a1, a2, b1, and b2 of the respective multipliers 1205 to 1209, and processing is performed in a sample unit.

Figure 11:
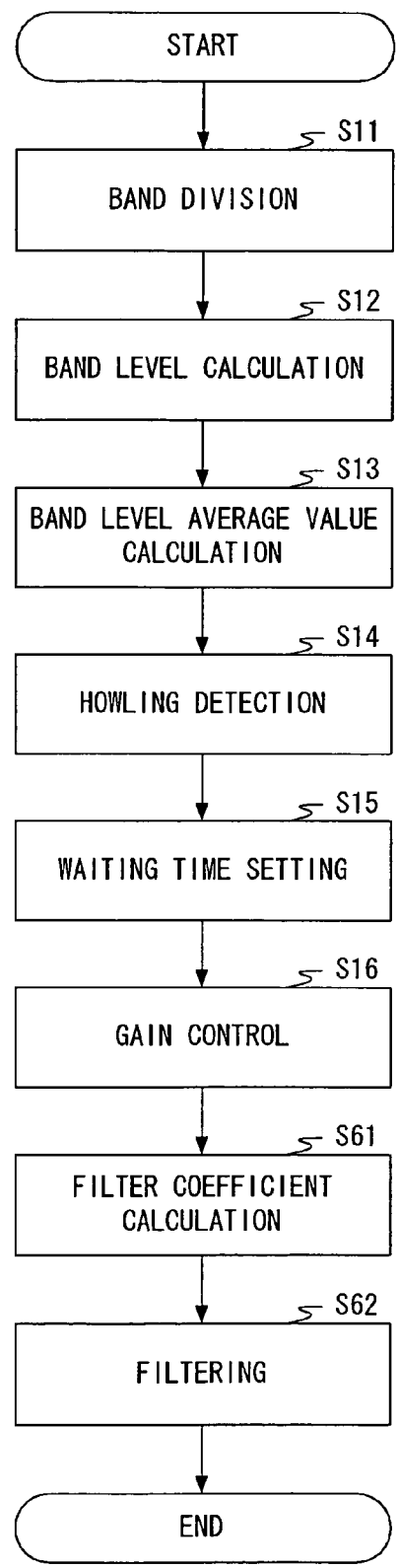
FIG. 11 is a flowchart illustrating processing of a howling control apparatus according to another specific form of Embodiment 1.
Figure 12:
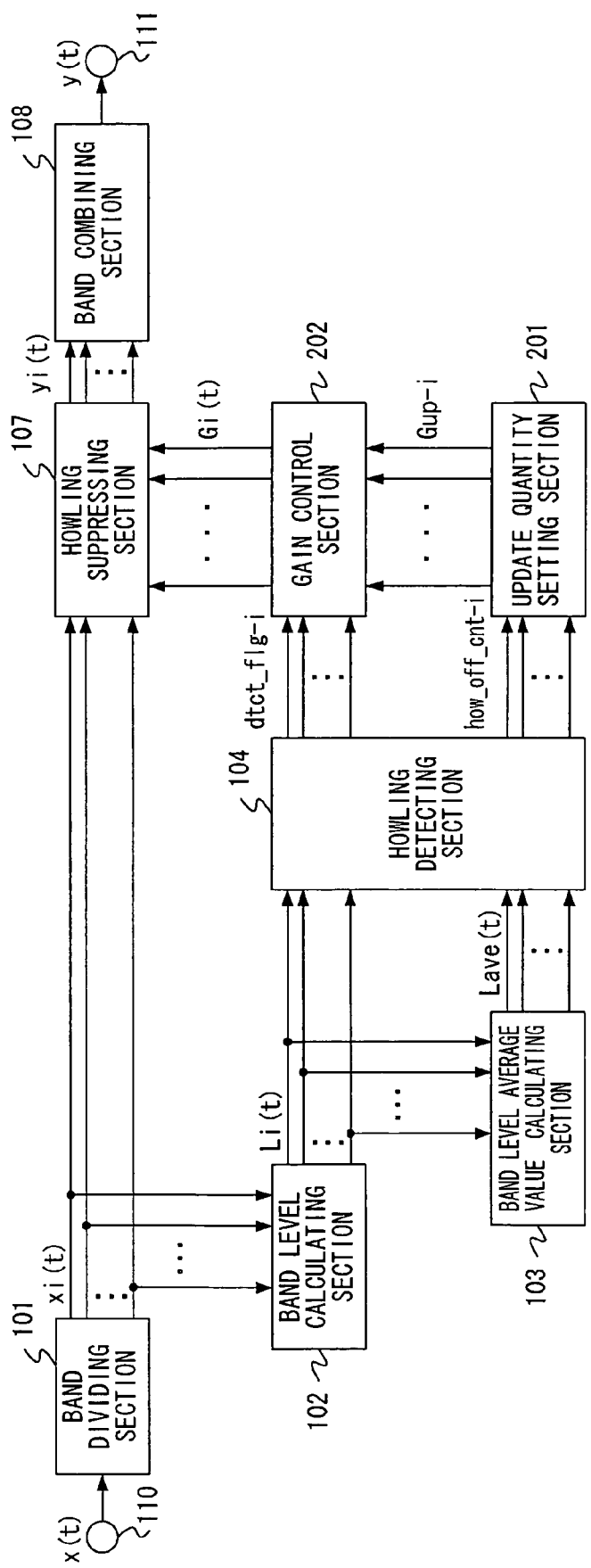
FIG. 12 is a schematic block diagram illustrating a howling control apparatus according to Embodiment 2 of the present invention.

Regarding the operation of the howling control apparatus, as illustrated in a flowchart of FIG. 11, similar to the aforementioned embodiment, an input signal x(t) is divided into a plurality of band division signals xi(t), each level Li(t) is calculated, an average value Lave(t) of the levels of all band division signals is calculated, occurrence of howling is detected based on the level Li(t) and the average value Lave(t) of the levels, and the waiting time is set from the number of frames in which no howling is detected and a previous waiting time, and gain control is performed based on the waiting time (S11 to S16).

Next, the filter coefficient calculating section 120 calculates a coefficient of the parametric equalizer 121 (IIR filter 121a) based on a gain calculated by the gain control section 106 and predetermined bandwidth and Q (value that decides the shape of filter) for every band allocated when the band level calculating section 102 calculates the band level (S61).

The following shows an example when the band dividing section 101 frequency divides the time signal into 128 points by the FFT. When a sampling frequency is set to 20 kHz, a frequency resolution per FFT one point becomes 156.25 Hz. When the band level calculating section 102 uses FFT 4 points as one band, the number of bands becomes 16 bands (=128 points/2/4points) and a bandwidth becomes 625 Hz (=156.25 Hz×4 points). The gain control section 106 calculates a gain for each band. The filter coefficient calculating section 120 calculates a coefficient of the parametric equalizer 121 (IIR filter 121a) based on the gain and predetermined bandwidth (625 Hz) and Q by a method such as a tustin transform and the like.

Sequentially, the parametric equalizer 121 performs filtering in a sample unit based on the filter coefficient calculated by the filter coefficient calculating section 120 (S62).

The aforementioned configuration makes it possible to shorten delay time between the input and output.

Embodiment 2

FIGS. 12 to 15 are view each explaining a howling control apparatus of Embodiment 2 of the present invention. Additionally, since this embodiment is configured to be substantially the same as the aforementioned Embodiment 1, the parts with the same configuration as those of Embodiment 1 are assigned the same numbers and only the characteristic portion will be explained.

This embodiment is characterized in that an update quantity setting section 201 that controls an update quantity Gup-i for returning a gain (to one time) is provided in place of the waiting time setting section 105 of the aforementioned Embodiment 1 and the update quantity of a gain control section 202 is variable.

Figure 13:
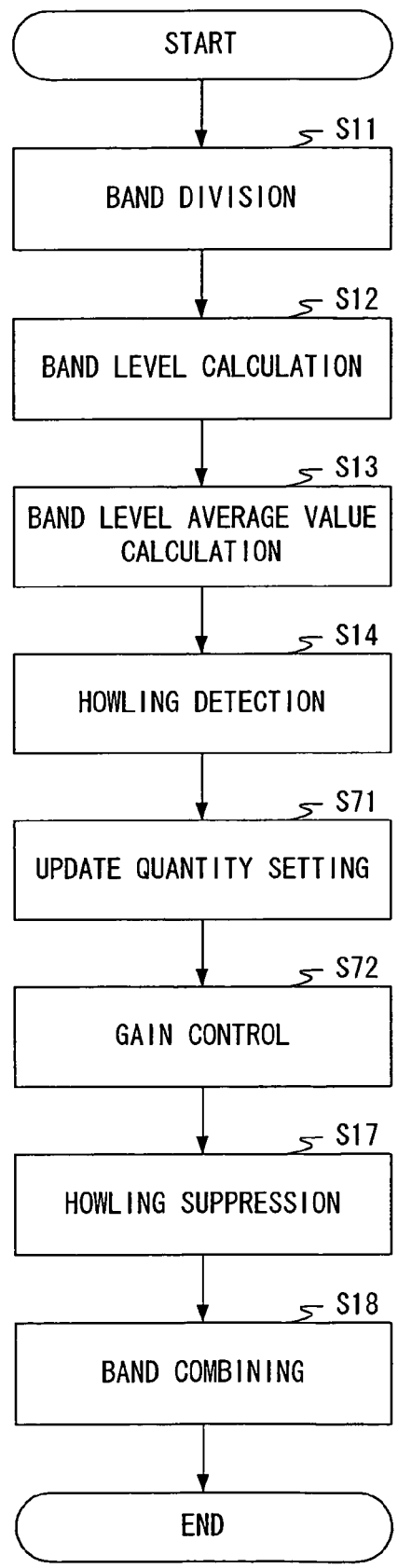
FIG. 13 is a flowchart illustrating processing of a howling control apparatus according to Embodiment 2.

More specifically, as illustrated in a flowchart of FIG. 13, similar to the aforementioned Embodiment 1, an input signal x(t) is divided into a plurality of band division signals xi(t), each level Li(t) is calculated, an average value Lave(t) of the levels of all frequency band division signals is calculated, and occurrence of howling is detected based on the level Li(t) and the average value Lave(t) of the levels (S11 to S14).

After that, the update quantity setting section 201 sets a current update quantity Gup-i from the howling observing time how_off_cnt-i observed by the howling detecting section 104 and a previously set update quantity Gup-i(S71).

Figure 14A:
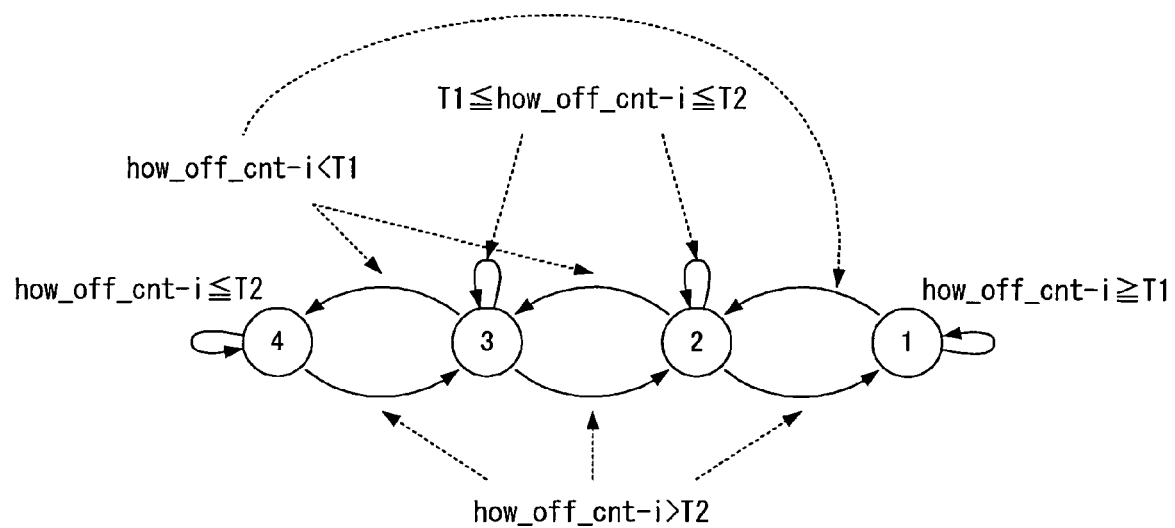
FIG. 14A is a state transition view illustrating an operation of an update quantity setting section of a howling control apparatus according to Embodiment 2.
Figure 14B:
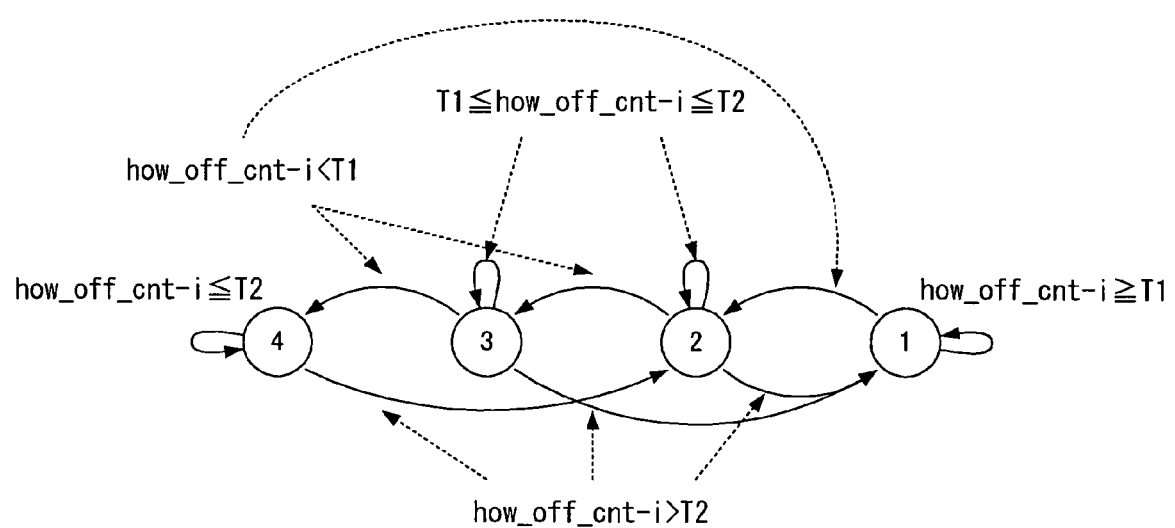
FIG. 14B is a state transition view illustrating another operation of an update quantity setting section of a howling control apparatus according to Embodiment 2.

The update quantity setting section 201 refers to the howling observing time how_off_cnt-i for each frame and sets a current update quantity Gup-i based on this value according to state transition views in FIGS. 14A and 14B. FIGS. 14A and 14B are views each illustrating a different state transition example. In addition, it is assumed that values of thresholds T1 and T2 used to perform determination on the howling observing time how_off_cnt-i are, for example, T1=1563 frames, T2=18750 frames, respectively.

A basic idea of the update quantity is that the update quantity Gup-i(>1) is set to be a larger value since it can be considered that no howling frequently occurs if the howling observing time how_off_cnt-i is long. While, since it can be considered that howling frequently occurs if the howling observing time how_off_cnt-i is short, the update quantity Gup-i(>1) is set to be a smaller value.

First, in FIG. 14A, an initial state is a state 1, and Gup-i is set to, for example, 1.003690 (=5.0 dB/s equivalence) in the state 1, and the state stays in the state 1 during how_off_cnt-i≧T1.

When how_off_cnt-i<T1 is reached, the state 1 transits to a state 2, and Gup-i is set to, for example, 1.00147 (=2.0 dB/s equivalence) in the state 2. The state stays in the state 2 during T1 ≦how_off_cnt-i≦T2, and returns to the state 1 when how_off_cnt-i>T2 is reached.

Moreover, when how_off_cnt-i<T1 is reached, the state 2 transits to a state 3, and Gup-i is set to, for example, 1.00037 (=0.5 dB/s equivalence) in the state 3. The state stays in the state 3 during T1≦how_off_cnt-i≦T2, and returns to the state 2 when how_off_cnt-i>T2 is reached.

Still moreover, when how_off_cnt-i<T1 is reached, the state 3 transits to a state 4, and Gup-i is set to, for example, 1.00007 (=0.1 dB/s equivalence) in the state 4. The state stays in the state 4 during how_off_cnt-i≦T2, and returns to the state 3 when how_off_cnt-i>T2 is reached.

Next, in FIG. 14B, an initial state is a state 1, and Gup-i is set to, for example, 1.003690 (=5.0 dB/s equivalence) in the state 1, and the state stays in the state 1 during how_off_cnt-i≧T1.

When how_off_cnt-i<T1 is reached, the state 1 transits to a state 2, and Gup-i is set to, for example, 1.00147 (=2.0 dB/s equivalence) in the state 2. The state stays in the state 2 during T1≦how_off_cnt-i≦T2, and returns to the state 1 when how_off_cnt-i>T2 is reached.

Moreover, when how_off_cnt-i<T1 is reached, the state 2 transits to a state 3, and Gup-i is set to, for example, 1.00037 (=0.5 dB/s equivalence) in the state 3. The state stays in the state 3 during T1≦how_off_cnt-i≦T2, and returns to the state 2 when how_off_cnt-i>T2 is reached.

Still moreover, when how_off_cnt-i<T1 is reached, the state 3 transits to a state 4, and Gup-i is set to, for example, 1.00007 (=0.1 dB/s equivalence) in the state 4. The state stays in the state 4 during how_off_cnt-i≦T2, and returns to the state 2 when how_off_cnt-i>T2 is reached.

Here, for example, when sampling frequency Fs=20 kHz, the number of FFT points=128 samples, and frame shift=64 samples, 1563 frames during T1≈5 s, 18750 frames during T2=60s.

Figure 15:
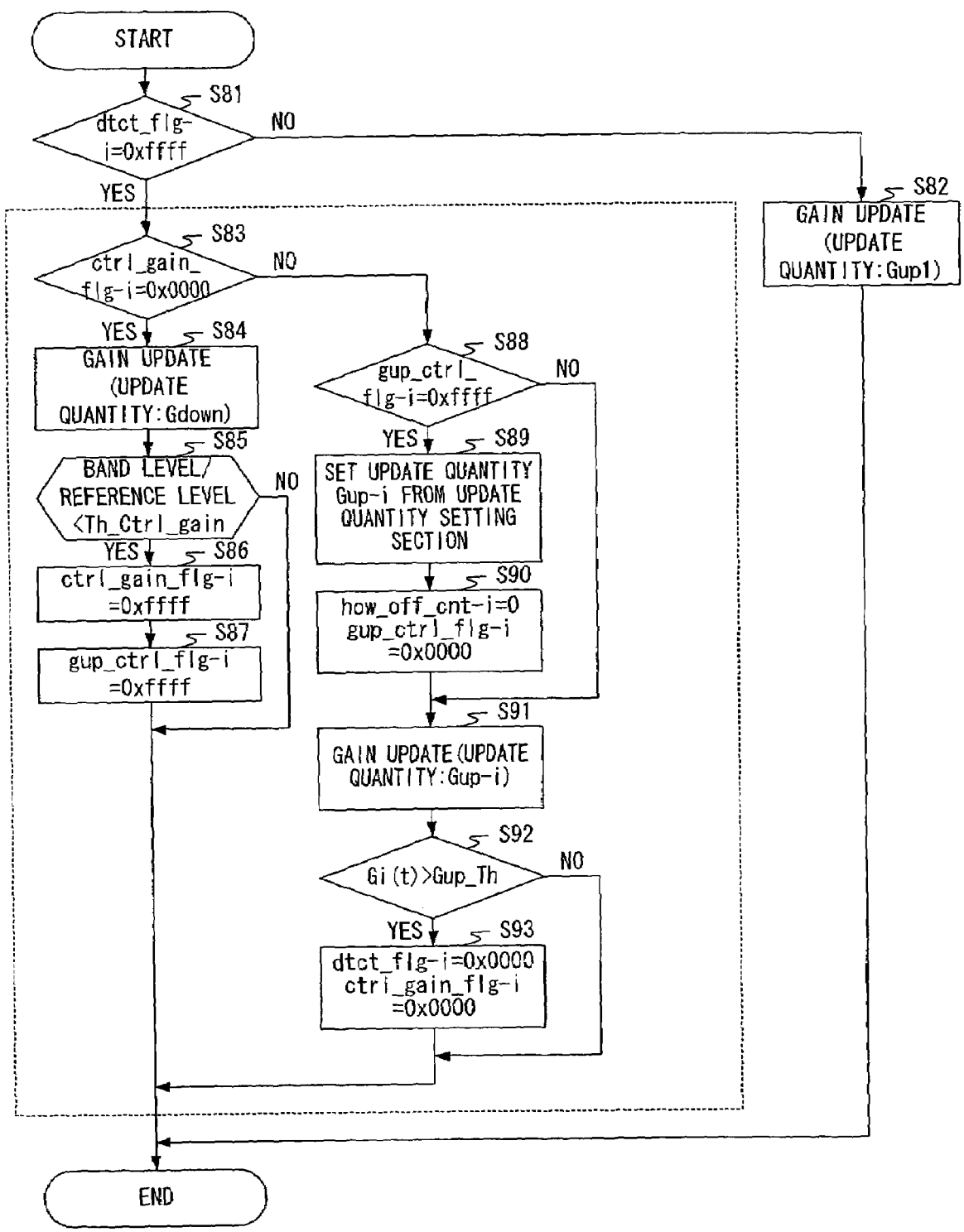
FIG. 15 is a flowchart illustrating processing of a gain control section of a howling control apparatus according to Embodiment 2.

Next, the gain control section 202 controls a gain by processing illustrated in a flowchart of FIG. 15 (S72).

As illustrated in FIG. 15, first of all, reference is made to the howling detection flag dtct_flg-i to check whether howling is detected (S81).

When dtct_flg-i=0x0000, it is judged that no howling occurs, and if the gain Gi(t) is under 1, the gain Gi(t) is updated according to the following equation in order to return the gain to '1' (S82).

$$Gi(t)=Gi(t-1) \times Gup1$$

where Gup1 is an update quantity for increasing the gain and a value of Gup1>1 is obtained.

When dtct_flg-i=0xffff, it is judged that howling occurs, and reference is made to the gain control flag ctrl_gain_flg-i to perform determination on whether gain Gi(t) (i is a band number) should be decreased to suppress howling or gain Gi(t) should be increased to cancel suppression (S83).

When ctrl_gain_flg-i=0x0000, the gain Gi(t) is updated according to the following equation in order to suppress howling (S84).

$$Gi(t)=Gi(t-1) \times G\text{down}$$

where Gdown is an update quantity for decreasing the gain and a value of 0<Gdown<1 is obtained. Moreover, a gain lower limit value is provided, thereby enabling to prevent suppression more than necessary.

Next, a ratio between the band level Li(t) and the reference level Lref-i(t) is compared with a gain control threshold Th_Ctrl_gain (S85).

When Li(t)/Lref-i(t)<Th_Ctrl_gain as a result of comparison, it is judged that occurrence of howling is stopped and processing shifts to processing for returning the gain Gi(t) to '1', so that the value of ctrl_gain_flg-i is set to 0xffff (S86) and the value of the update quantity setting flag gup_ctrl_flg-i for determining whether gain Gi(t) should be immediately returned to '1' is set to 0xffff (S87).

When ctrl_gain_flg-i=0xffff as a result of comparison in S83, it is judged that occurrence of howling is stopped, and reference is made to the value of the update quantity setting flag gup_ctrl_flg-i for determining whether the update quantity is set (S88). When gup_ctrl_flg-i=0xffff, since Gup-i of processing (gain return processing) for returning the gain to '1' is not set, the update quantity set by the update quantity setting section 201 is set (S89).

After that, the howling observing time how_off_cnt-i is reset to '0' as a preparation to a next processing, and gup_ctrl_flg is set to 0x0000 in order to indicate that the update quantity is set (S90).

Additionally, when gup_ctrl_flg-i=0x0000 as a result of comparison in S88, processing flow proceeds to a next step since the setting of Gup-i is completed.

Next, the gain Gi(t) is updated according to the following equation in order to return the gain to one time after the howling suppression (S91).

$$Gi(t)=Gi(t-1) \times Gup\text{-}i$$

where Gup-i is an update quantity for increasing the gain and a value that is set by the update quantity setting section 201.

Next, it is determined whether the gain Gi(t) exceeds a gain threshold Gup_Th (for example, 0.7 times (=−3.0 dB)) (S92) and when the gain Gi(t) exceeds the gain threshold Gup_Th, 0x0000 is set to the howling detection flag dtct_flg-i and the gain control flag ctrl_gain_flg-i to restart the detection of howling (S93).

After that, similar to the aforementioned Embodiment 1, by use of the obtained Gi(t), the howling suppressing section 107 multiplies the band division signals xi(t) by the gain Gi(t) to obtain yi(t), and the band combining section 108 calculates a time signal y(t) by a method corresponding to the band division method performed by the band dividing section 101, and outputs y(t) to an DA converter, an amplifier, a speaker, and the like through the output terminal 111 (S17, S18).

As explained above, in the howling control apparatus of this embodiment, the howling detecting section 104 counts the number of frames in which no howling occurs, and the update quantity setting section 201 sets an update quantity at the time of returning the gain after the howling suppression based on the number of frames and the previous update quantity, so that it is possible to continue the howling suppression without repeating the howling suppression and cancellation even in a transient situation where howling occurrence and stopping frequently occur.

Accordingly, in this embodiment, the band level calculating section 102 calculated the respective levels of the band division signals divided by the band dividing section 101. However, the band level calculating section 102 may add frequency band signals divided by the band dividing section 101 by the predetermined number thereof, and use them as one band.

Figure 16:
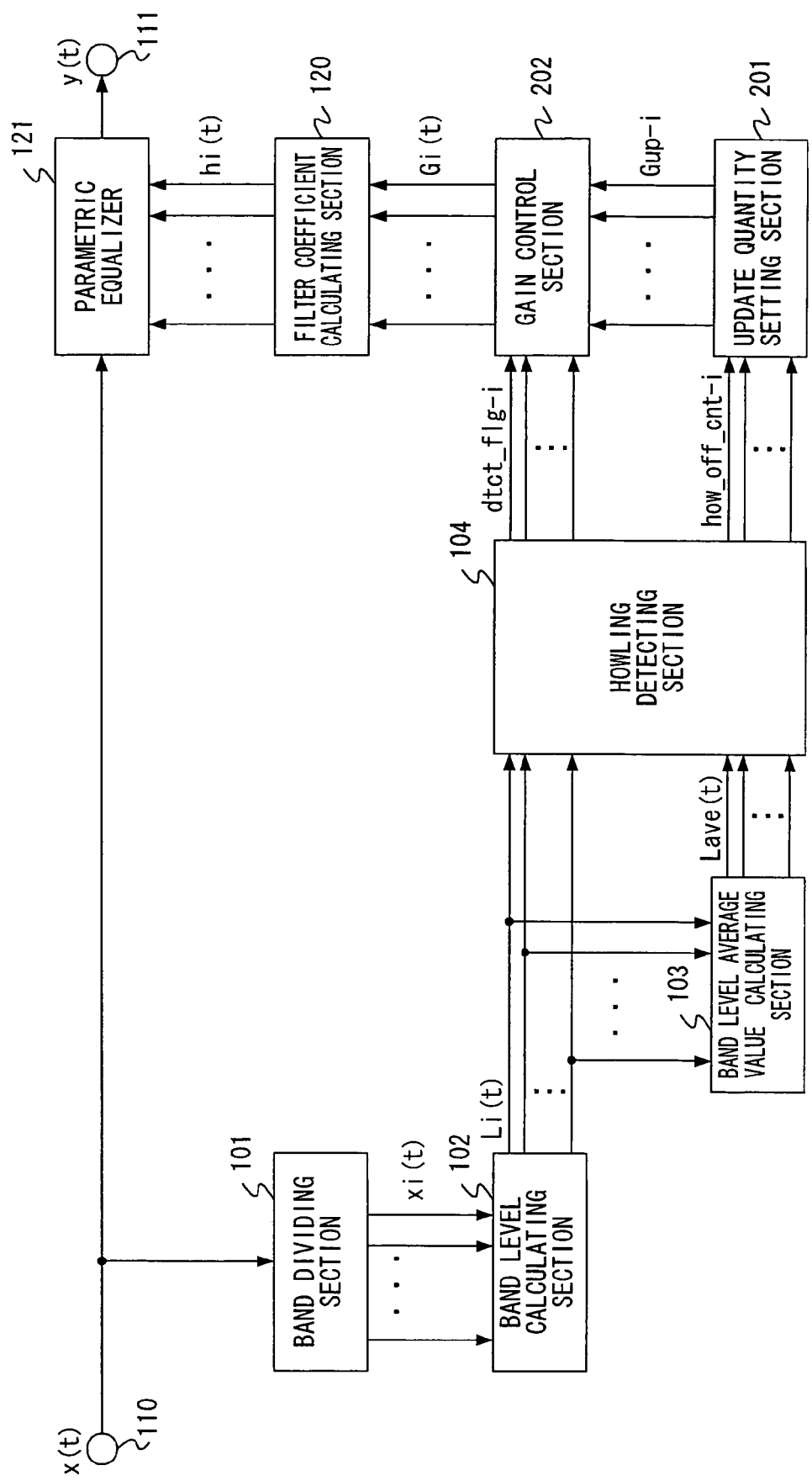
FIG. 16 is a schematic block diagram illustrating a howling control apparatus according to another specific form of Embodiment 2.

Another specific form of this embodiment is characterized in that a parametric equalizer 121 that performs filter processing for each divided frequency band and a filter coefficient calculating section 120 that calculates a filter coefficient of each frequency band of the parametric equalizer 121 are provided in place of the howling suppressing section 107 and the band combining section 108 as illustrated in FIG. 16.

The filter coefficient calculating section 120 and the parametric equalizer 121 are configured in the same manner as those of the aforementioned Embodiment 1, and the explanation is omitted.

Figure 17:
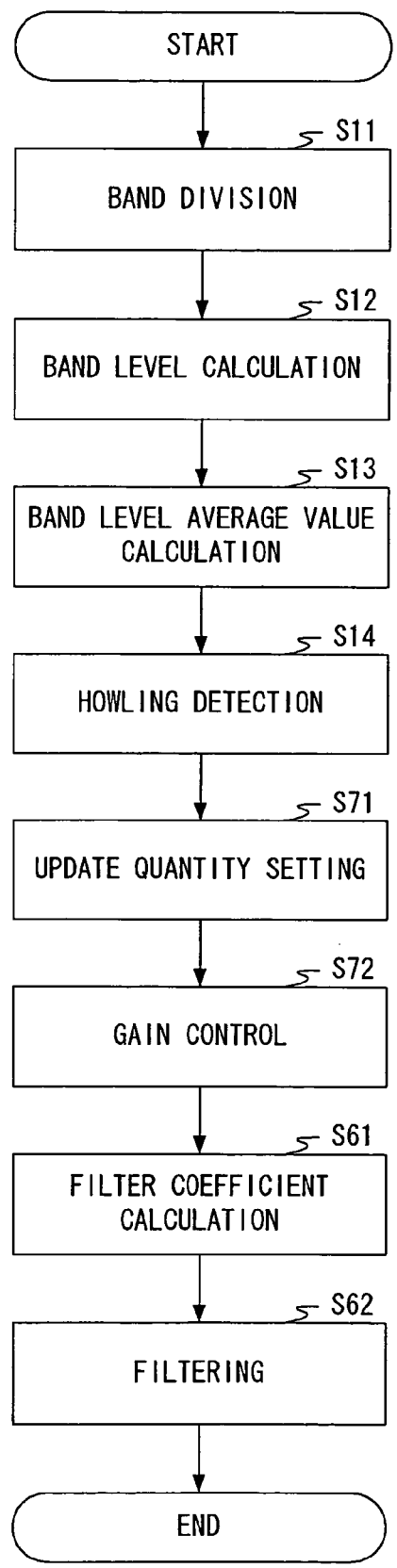
FIG. 17 is a flowchart illustrating processing of a howling control apparatus according to another specific form of Embodiment 2.

Regarding the operation of the howling control apparatus, as illustrated in a flowchart of FIG. 17, similar to the aforementioned embodiment, an input signal x(t) is divided into a plurality of band division signals xi(t), each level Li(t) is calculated, an average value Lave(t) of the levels of all band division signals is calculated, and occurrence of howling is detected based on the level Li(t) and the average value Lave(t) of the levels (S11 to S14).

Next, an update quantity is set from the number of frames in which no howling is detected and a previous update quantity, and gain control is performed based on the update quantity (S71, S72)

Sequentially, similar to another specific form of the aforementioned Embodiment 1, the filter coefficient calculating section 120 calculates a coefficient of the parametric equalizer 121 (IIR filter 121a) for each band based on a gain and predetermined bandwidth and Q, and the parametric equalizer 121 performs filtering in a sample unit based on the filter coefficient calculated by the filter coefficient calculating section 120 (S61, S62).

The aforementioned configuration makes it possible to shorten delay time between the input and output.

As explained above, according to the present invention, a holding control section controls time up to the cancellation of howling suppression according to the frequency of howling occurrence, thereby enabling to eliminate the repetition of howling suppression and cancellation.

This application is based on the Japanese Patent Application No. 2002-067083 filed on Mar. 12, 2002, entire content of which is expressly incorporated by reference herein.

INDUSTRIAL APPLICABILITY

The present invention can be applied to a howling control apparatus and howling control method for controlling a howl generated by sound coupling between a speaker and a microphone in an acoustic apparatus having a microphone and a speaker such as a hearing aid, loud-speaker system, and the like.

The invention claimed is:

1. A howling control apparatus comprising: detecting section that measures a howling observing time that is time for which no howling occurs in an input signal and that detects howling when the howling occurs in the input signal; control section that controls suppression processing of the detected howling by setting a gain based on the howling observing time; and suppressing section that performs howling suppression processing to the input signal using the gain.

2. The howling control apparatus according to claim 1, wherein said control section includes: a waiting time setting section that sets a waiting time for which the gain used for the howling suppression processing is maintained based on the howling observing time; and a gain control section that returns the gain to an initial value when the set waiting time passes.

3. The howling control apparatus according to claim 2, wherein said waiting time setting section sets a current waiting time according to the howling observing time and a waiting time set in the past.

4. The howling control apparatus according to claim 3, wherein said waiting time setting section sets the current waiting time to be shorter than the waiting time set in the past when the howling observing time is longer than a predetermined reference, and sets the current waiting time to be longer than the waiting time set in the past when the howling observing time is shorter than a predetermined reference.

5. The howling control apparatus according to claim 1, wherein said control section includes: an update quantity setting section that sets an update quantity of the gain used for the howling suppression processing after the howling suppression based on the howling observing time; and a gain control section that updates the gain by the set update quantity after the howling suppression.

6. The howling control apparatus according to claim 5, wherein said update quantity setting section sets a current update quantity according to the howling observing time and an update quantity set in the past.

7. The howling control apparatus according to claim 5, wherein said update quantity setting section sets the current update quantity to be larger than the update quantity set in the past when the howling observing time is longer than a predetermined reference, and sets the current update quantity to be smaller than the update quantity set in the past when the howling observing time is shorter than a predetermined reference.

8. The howling control apparatus according to claim 1, wherein said detecting section includes: a band dividing section that divides an input signal into band division signals of a plurality of frequency bands; a band level calculating section that calculates the respective band levels of the band division signals obtained by division; and a band level average value calculating section that calculates an average value of the respective calculated band levels of the band division signals, and detects howling using a ratio between the band level and the band level average value.

9. The howling control apparatus according to claim 8, wherein said suppressing section includes: a howling suppressing section that multiplies the band division signals by a gain set by said control section; and a band combining section that combines the band division signals multiplied by the gain.

10. The howling control apparatus according to claim 8, wherein said suppressing section includes: a filter coefficient calculating section that calculates a coefficient for filtering according to a gain set by said control section and a bandwidth of each band division signal; and a parametric equalizer that multiplies each band division signal by the calculated coefficient.

11. A howling control method comprising the steps of: measuring a howling observing time that is time for which no howling occurs in an input signal; detecting howling when the howling occurs in the input signal; controlling suppression processing of the detected howling by setting a gain based on the howling observing time; and performing howling suppression processing to the input signal using the gain.

* * * * *